Sept. 27, 1966     A. J. DREYER     3,274,721
PICTURE FRAMING
Filed March 30, 1964
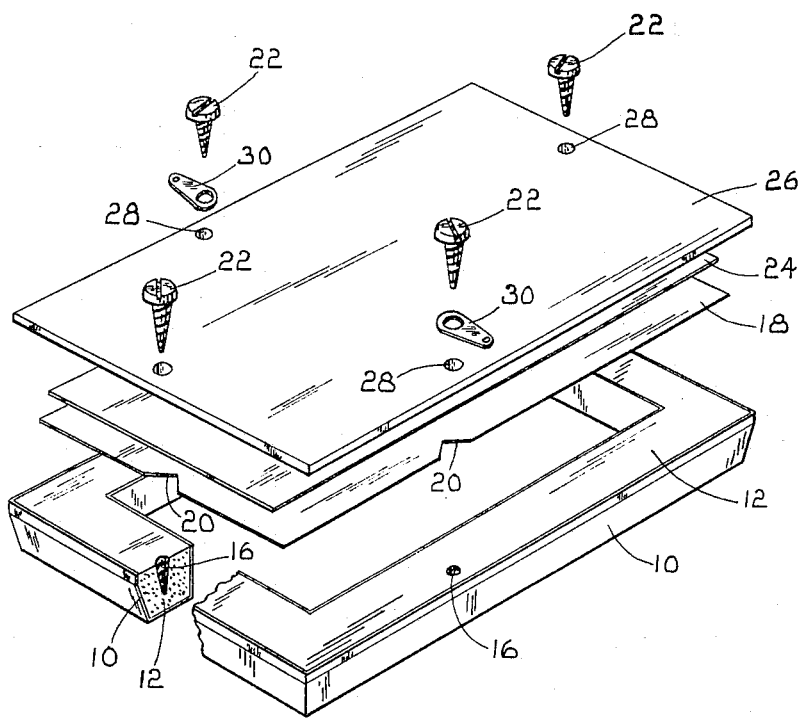
INVENTOR
ALWYN J. DREYER
By Irwin S. Thompson
ATTY.

United States Patent Office 3,274,721
Patented Sept. 27, 1966

3,274,721
PICTURE FRAMING
Alwyn J. Dreyer, Lynwill Estate, Boskop, Roodepoort,
Republic of South Africa
Filed Mar. 30, 1964, Ser. No. 355,718
2 Claims. (Cl. 40—152)

This invention relates to picture framing.

Conventionally pictures are framed by being inserted together with a glass covering and a backing into a rebate in a prepared frame. Securing the sandwich of glass, picture and backing in place is a somewhat difficult operation.

It is an object of the present invention to simplify the process of picture framing.

It is a further object of the invention to provide a strong picture frame which is cheap to produce, easy to use, light in weight, and attractive in appearance.

According to the invention, a method of framing a picture includes the steps of sandwiching the picture between a backing member and a straight-backed frame, the backing being secured to the frame by screws, nails, clips, adhesives, or the like.

In a preferred form of the invention, registering holes are provided in the backing member and the frame for the screws.

A sheet of transparent material is furthermore provided between the picture and the frame to protect the picture. The sheet of transparent material may also have holes to register with the holes in the backing member and frame. A mask for the picture may also be provided and this may be interposed between the picture and transparent sheet.

Further according to the invention, an envelope of transparent plastic material is provided for receiving the picture. The unsealed side may then be sealed and the envelope sandwiched between the backing member and the frame. The envelope may be made of two superimposed layers of plastic material sealed on three sides, leaving the fourth side open for insertion of the picture.

In this specification the term "picture" is intended also to include other objects such as certificates, mirrors and the like.

Still further according to the invention, the frame includes a channel defining a geometrical shape such as a square, rectangle, circle or ellipse, the channel being filled with a suitable foamed resinous material capable of adhering to the inside of the channel.

Preferably, the foamed plastic material is polyurethane foam, and the channel is mounted from high-impact polystyrene.

Self-tapping screws may be provided to secure the assembly, in which case the preformed holes in the frame may be dispensed with, the polyurethane foam easily forming the complemental threads of the self-tapping screw.

An embodiment of the invention is described below with reference to the accompanying drawing, which is An exploded perspective view, with a portion cut away, of a picture frame assembly according to the invention.

In the drawing, a frame comprises a rectangular channel 10 of high-impact polystyrene, moulded in any suitable manner and of any design or ornamentation. The frame may also take the form of a square, circle, ellipse or the like. The channel 10 is filled with polyurethane foam 12 and presents a straight surface at its back. Threaded holes 16 are provided in the polyurethane foam.

A sheet of transparent material 18 is provided with notches 20 cut away to allow screws 22 to pass into the polyurethane, and the picture 24 is sandwiched between the sheet 18 and a backing member 26, which is conveniently made of hardboard or the like, and is provided with screw holes 28. Lugs 30 are also provided for hanging purposes.

The sheet 18 may take the form of an envelope for accommodating the picture 24. This ensures that no dust will harm the picture.

A suitable mask may also be incorporated into the assembly.

I claim:

1. A picture frame assembly including a frame, a backing member and a transparent sheet larger than the frame aperture and having notches in its periphery, between which sheet and backing member a picture is adapted to be located, and fastener elements extending through the backing member and the notch spaces in the sheet into the frame to clamp the sheet between the backing member and the back of the frame.

2. A picture frame assembly including a frame, a backing member and a transparent sheet larger than the frame aperture and having notches in its periphery, between which sheet and backing member a picture is adapted to be located, and self-tapping screws extending through the backing member and the notch spaces in the sheet into the frame to clamp the sheet between the backing member and the back of the frame, the frame comprising a moulded plastic channel defining in plan a geometric shape filled with a foamed resinous material adhering to the inside of the channel.

References Cited by the Examiner

UNITED STATES PATENTS

| | | | |
|---|---|---|---|
| 189,903 | 4/1877 | Quarry | 40—158 |
| 1,842,285 | 1/1932 | Place | 40—154 |
| 2,296,596 | 9/1942 | Brown | 40—154 |
| 2,346,283 | 4/1944 | Weiss | 40—152 X |
| 2,677,910 | 5/1954 | Morgan | 40—158 |
| 3,186,118 | 6/1965 | Smith | 40—154 |

EUGENE R. CAPOZIO, *Primary Examiner.*

W. J. CONTRERAS, *Assistant Examiner.*